May 29, 1956 A. C. HUMMEL 2,747,867
PRODUCTION LEVER FOR TAPE DISPENSERS
Filed June 26, 1953
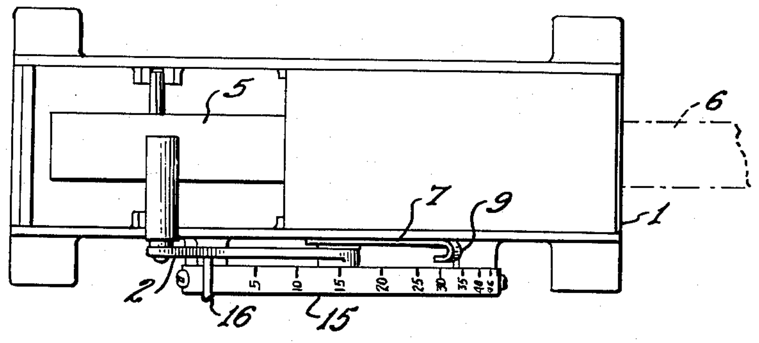
FIG. 2.
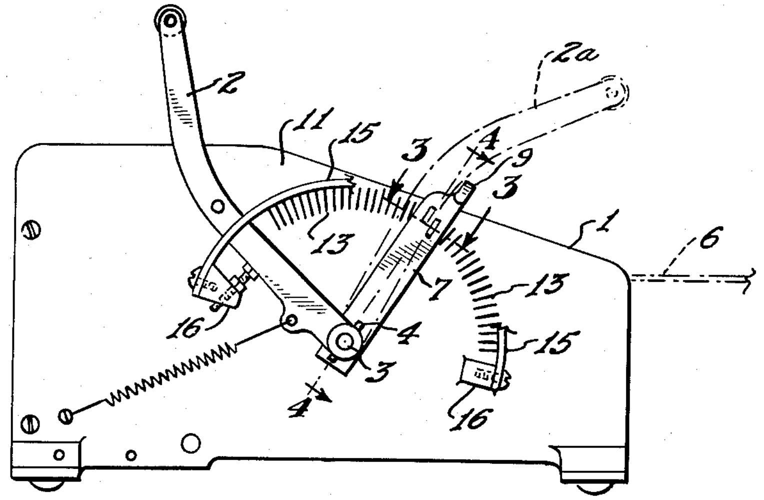
FIG. 1.
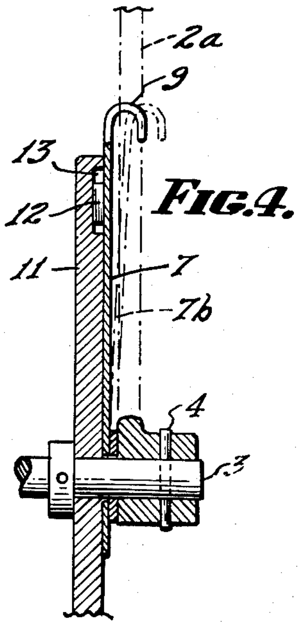
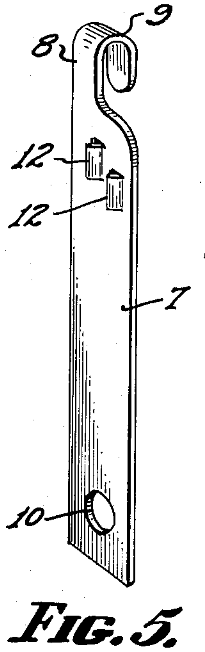
FIG. 5.
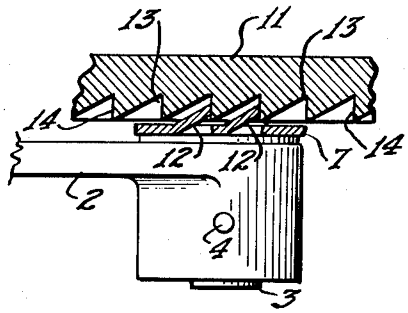
FIG. 3.
INVENTOR.
AUGUST C. HUMMEL,
BY Allen & Allen
ATTORNEYS.

United States Patent Office 2,747,867
Patented May 29, 1956

2,747,867

PRODUCTION LEVER FOR TAPE DISPENSERS

August C. Hummel, Cincinnati, Ohio

Application June 26, 1953, Serial No. 364,347
4 Claims. (Cl. 271—2.4)

My invention relates to tape dispensers, and more particularly to tape dispensers of the class wherein a shaft is rotated to dispense the tape in a length proportional to the degree of rotation of the shaft.

In dispensers of this type, an actuating arm is secured to the shaft in such fashion that the forward movement of the actuating arm dispenses the tape in a length dependent upon the degree of movement of the arm. The length of the tape dispensed is determined by the angular position of the actuating arm at its limit of forward movement, which is controlled by the operator. The usual type of manual dispenser carries a pointer or indicator which runs over a scale during the movement of the actuating arm, thereby indicating to the operator where to stop the forward movement of the arm in order to dispense a piece of tape of a desired length, as shown by the indicia on the scale.

In shipping departments and other places wherein large amounts of tape are used, the operators normally work very rapidly and hence invariably overrun the proper stopping point on the scale, which results in cutting off lengths of tape usually considerably in excess of the amount required. During the course of a day's operation, a considerable amount of tape is wasted by such incorrect dispensing and results in a considerable waste of money over a relatively short period of time.

Where the operator is doing production work which requires many strips of tape of the same length, it has hitherto been proposed to provide the dispenser with a movable abutment which may be placed in the path of the actuating arm and thus stop the movement of the arm and the rotation of the shaft at the same predetermined place. However, where different lengths of tape are to be dispensed successively, such abutment means becomes impractical since they are secured in place by means of a set screw or similar locking means which must be loosened and retightened with each change in position of the abutment. Consequently, from a production standpoint the abutment means becomes more of a liability than an asset. It has also been proposed to provide abutment means in the form of a plurality of push buttons which may be selectively depressed to effect stoppage of the actuating arm at the desired degree of rotation; and while such push button arrangements produce highly satisfactory results, they add greatly to the cost of the dispenser.

It is a principal object of my invention to provide an abutment means for a tape dispenser of the class described which comprises a production lever or arm journaled on the shaft driven by the actuating arm and arranged to be quickly and conveniently adjusted to stop the forward movement of the actuating arm at any desired degree of rotation.

It is a further object of my invention to provide a production lever of the character described which is extremely economical to manufacture and can be applied to any tape dispenser of the class described.

It is a further object of my invention to provide a production lever of the character described which can be maintained in any desired position without the use of set screws or other locking means requiring manual adjustment, the arrangement being such that the actuating arm of the dispenser will serve to lock the production lever or arm in fixed position when the actuating arm is juxtaposed to the production lever.

It is still a further object of my invention to provide a production lever of the character described which may be quickly and conveniently adjusted between each dispensing operation so as to accurately dispense the tape in varying lengths.

These and other objects of my invention which will appear hereinafter or which will be apparent to the skilled worker in the art upon reading these specifications, I accomplish by that construction and arrangement of parts of which I shall now describe an exemplary embodiment.

Reference is now made to the figures of the drawings, wherein:

Figure 1 is a side elevational view of a tape dispenser incorporating my production lever.

Figure 2 is a plan view of the tape dispenser illustrated in Figure 1.

Figure 3 is a sectional view taken along the line 3—3 of Figure 1.

Figure 4 is a sectional view taken along the line 4—4 of Figure 1.

Figure 5 is a perspective view of the production lever.

Briefly, in the practice of my invention, I provide an elongated lever arm which is adapted to be journaled to the shaft in a tape dispenser to which the actuating arm is fixed. The lever arm is journaled on the shaft between the actuating arm and the adjacent side wall of the dispenser, the lever arm being journaled for movement independently of the actuating arm and shaft. The lever arm carries adjacent its free end an outwardly extending abutment positioned to be contacted by the lever arm, and inwardly directed projections or teeth adapted to engage in serrations in the wall of the dispenser. Thus as the lever arm is rotated on the shaft the projections may be selectively engaged in the serrations to maintain the lever arm in any desired position. The lever arm is preferably formed from stock which is sufficiently resilient so that the arm may be flexed outwardly to disengage the projections from the serrations. Thus the operator has but to flex the lever arm outwardly, rotate it to the desired position, and then release it so that the projections may engage the adjacent serrations, when it is desired to change its position.

The lever arm is locked in fixed position by means of the actuating arm which, when juxtaposed to the lever arm, prevents the lever arm from being flexed sufficiently to remove the projections from the serrations in the wall of the dispenser. Consequently at such time as the abutment on the end of the lever arm is struck by the actuating arm, the lever arm is locked in place and cannot be moved. However, as soon as the actuating arm is released for return movement to the starting position, the lever arm is automatically freed so that it may be moved by the operator.

By means of the production lever, the exact length of tape which is desired will be dispensed, irrespective of the speed of operation, since it is the abutment carried by the lever arm which will determine the degree of rotation of the actuating arm and hence the length of the tape, and not the visual inspection of the operator.

Referring now to Figures 1 and 2 of the drawings, I have therein shown a manually operated tape dispenser 1 in which the tape is dispensed by movement of the actuating arm 2 which is fixed to the shaft 3, as by means of the pin 4. The length of the tape dispensed will be determined by the angular rotation of the shaft 3, which in turn is controlled by the extent of movement of the actuating arm 2. A supply roll of tape is indicated at 5, and 6 indicates a length of tape dispensed by the forward movement of the actuating arm to the position 2a illustrated in dotted lines in Figure 1.

The production lever 7, as best seen in Figure 5, comprises an elongated arm terminating in a narrowed portion 8 reversely bent to form an abutment 9. The lever arm is provided at its lower end with an opening 10 of a size slightly greater than the shaft 3 on which it is journaled, lying between the actuating arm 2 and the side wall 11 of the tape dispenser. The lever arm is positioned with the abutment 9 extending outwardly for contact by the actuating arm 2; and as best seen in Figure 4, the lever arm 7 is in substantially face-to-face contact with the side wall 11.

Near its upper end the lever arm 7 carries one or more projections or teeth 12 which are inwardly directed and adapted to engage one or more of the serrations 13 formed in the side wall 11. The serrations 13 are radially disposed with respect to the shaft 3 so as to be contacted by the projections 12 in all positions of the lever arm 7. The projections 12 are preferably disposed in the direction best seen in Figure 3 of the drawings, so as to contact the perpendicularly arranged wall surfaces 14 of the serrations, thereby securely maintaining the lever arm against forward movement upon contact of the actuating arm 2 with the abutment 9.

As will be evident from Figure 1, the width of the lever 7 is such that the actuating arm, when in position 2*a*, will overlie a portion at least of the lever arm prior to contact of the actuating arm with the abutment 9; and the spacing between the inner surface of the actuating arm and the side wall 11 of the dispenser is such that when the actuating arm is in the position 2*a*, the lever arm cannot be flexed outwardly to remove the projections 12 from the serrations 13. To this end the spacing between the actuating arm 2 and the side wall 11 is preferably slightly greater than the thickness of the lever arm 7 and somewhat less than the combined thickness of the lever arm and the projections 12. It will be apparent from Figure 4 that when the actuating arm is in the position 2*a*, the lever arm 7 cannot be flexed outwardly to the position 7*b* (indicated in dotted lines), so as to disengage the projections from the adjacent serrations. Consequently, immediately prior to and at such time as the actuating arm comes in contact with the abutment on the lever arm, the lever arm is positively locked in position and hence serves to stop the forward movement of the actuating arm at the desired point. However, as soon as the actuating arm is released for return movement to its starting position, the lever arm may again be flexed outwardly to release the projections 12 and hence move the lever arm to any other position desired. It will be understood, of course, that the lever arm will be formed from a resilient material, preferably metal, which can be flexed to the degree desired.

The device is preferably provided with a scale 15 mounted on brackets 16 by means of which the correct setting of the lever arm may be determined. The actuating arm 2 may likewise carry a pointer 16 for indicating the length of tape which will be dispensed by any degree of forward movement of the actuating arm.

From the above, it will be apparent that I have provided a simple and inexpensive production lever for tape dispensers which may be easily and readily attached to many types of dispensers and which permits the dispensing of different lengths of tape easily, as well as providing for the production dispensing of a plurality of pieces of tape of the same length.

Modification may, of course, be made in my invention without departing from the spirit of it, and I do not intend to limit myself otherwise than as set forth in the claims which follow.

Having thus described my invention in an exemplary embodiment, what I claim as new and desire to secure by Letters Patent is:

1. In a tape dispenser wherein a shaft is rotated to dispense the tape in a length proportional to the degree of rotation of the shaft, and wherein one end of the shaft extends outwardly beyond a wall of the dispenser and an actuating arm for rotating the shaft is fixed to the extending end thereof and adapted to be moved in an arcuate path, means for arresting dispensing movement of the actuating arm at a predetermined degree of rotation of the shaft, said means comprising a lever arm journaled on the shaft between the actuating arm and the said wall of the dispenser for movement independently of said actuating arm in an arcuate path paralleling the path of said actuating arm, a projecting abutment on said lever arm adapted to lie in the path of said actuating arm to prevent movement thereof beyond said lever arm, interengaging means carried by said lever arm and the wall of said dispenser for selectively maintaining the lever arm in predetermined positions, said lever arm being in substantially face-to-face contact with the said wall of the dispenser and capable of having its outermost end flexed outwardly so as to disengage said interengaging means to permit movement of said lever arm to a different position, the distance between the inner surface of the actuating arm and the said wall of the dispenser being greater than the thickness of the lever arm and yet smaller than the combined thickness of the lever arm and the interengaging means carried thereon, whereby when the actuating arm is juxtaposed to said lever arm during dispensing movement thereof, said lever arm is prevented from being flexed outwardly so as to disengage said interengaging means.

2. The dispensing device claimed in claim 1 wherein the outwardly projecting abutment on said lever arm is so positioned that a portion at least of the actuating arm will be juxtaposed to the lever arm prior to contact of the actuating arm with the said abutment.

3. The structure claimed in claim 2 wherein said interengaging means comprises at least one inwardly directed projection carried by said lever arm and a plurality of serrations in the wall of the dispenser, said serrations being arranged in an arcuate path and adapted to selectively receive the said projection.

4. In a tape dispenser wherein an actuating arm is fixed to a shaft projecting outwardly from a wall of the dispenser, said actuating arm being adapted to be moved in an arcuate path to dispense a length of tape proportionate to the movement of the actuating arm, means for arresting the dispensing movement of the actuating arm at a predetermined point in its path of travel, said means comprising a lever arm journaled on the said shaft between the actuating arm and the said wall of the dispenser, said lever arm being movable independently of said actuating arm in an arcuate path paralleling the path of said actuating arm, a projecting abutment on said lever arm adapted to lie in the path of said actuating arm to arrest dispensing movement of said actuating arm when it is juxtaposed to the said lever arm, interengaging means carried on said lever arm and the wall of the dispenser for selectively maintaining the lever arm in predetermined fixed position, said lever arm being in substantially face-to-face contact with the said wall of the dispenser and capable of being flexed outwardly so as to disengage the said interengaging means to permit movement of the lever arm to a different position, the distance between the inner surface of the actuating arm and the wall of the dispenser being greater than the thickness of the lever arm and yet insufficient to permit flexing of the said lever arm so as to disengage said interengaging means, whereby upon juxtaposition of the actuating arm to said lever arm during dispensing movement of said actuating arm, said lever arm is secured against flexing movement sufficient to disengage said interengaging means.

References Cited in the file of this patent

UNITED STATES PATENTS

| | | |
|---|---|---|
| 1,921,625 | Link | Aug. 8, 1933 |
| 2,148,026 | Krueger | Feb. 21, 1939 |
| 2,213,908 | Goldstein | Sept. 3, 1940 |
| 2,519,701 | Richardson | Aug. 22, 1950 |